United States Patent Office 2,819,320
Patented Jan. 7, 1958

2,819,320

1,1,2,2-TETRAFLUOROCYCLOHEPTADIENES

John J. Drysdale, Clifton Park Manor, Del., assignor to E. I. du Pont de Nemours and Company, Wilmington, Del., a corporation of Delaware No Drawing. Application February 9, 1956
Serial No. 564,384

6 Claims. (Cl. 260—648)

This invention relates to fluorine-containing cyclic dienes having a seven-membered ring, and to a method for their preparation.

A number of naturally occurring products contain compounds having seven-membered rings. These cyclic compounds have been found to possess valuable plant regulating and pesticidal properties. Among such cyclic compounds those containing the 2-hydroxy-2,4,6-cycloheptatrien-1-one ring are of particular interest. More specifically, 2-hydroxy-2,4,6-cycloheptatrien-1-one, tropolone, is of especially interest since the tropolone ring has been found to be present in biologically active products, such as colchicine, and in fungicides, including the thujaplicins which are part of the active components in cedar wood. The hitherto known synthetic methods for preparing tropolone from available starting materials are not as satisfactory as desired for practical purposes. In view of the importance of tropolone, it is therefore desirable to prepare new starting materials for use in its synthesis.

Dicarboxylic acids are of utility in the preparation of polyester, polyamide, and polyester-amide resins which are of use in the film, filament, and coatings fields.

This invention has as an object the preparation of new intermediates for tropolone. A further object is the preparation of new dicarboxylic acid intermediates. Other objects will appear hereinafter.

These objects are accomplished by the present invention of a new class of tetrafluorocycloheptadienes which can readily be hydrolyzed to tropolone. These new compounds are 1,1,2,2-tetrafluorocycloheptadienes. They have the formulas

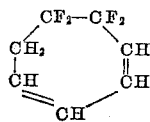

and

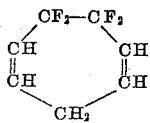

The new compounds of this invention have hydrogen on each carbon other than the fluorine-bearing carbons, i. e., on each carbon numbered higher than 2, and have the double bonds on carbon atoms of which at least one is directly attached to fluorine-bearing carbon.

The 1,1,2,2-tetrafluorocycloheptadienes of this invention are prepared by heating 6,6,7,7-tetrafluorobicyclo(3.2.0)-hept-2-ene at a temperature of 600° to 750° C. at reduced pressure, i. e., at pressures less than 760 mm. Hg.

The process of this invention is conveniently carried out by passing 6,6,7,7-tetrafluorobicyclo(3.2.0)-hept-2-ene through a reaction zone heated to a temperature of from 600° to 750° C. at reduced pressure. Preferably the reaction zone is maintained at a temperature of about 700° C.±15° C. and at a pressure of less than 50 mm. mercury. Temperatures above 750° C. and below 600° C. are less desirable since under these conditions low yields of the desired tetrafluorocycloheptadienes are obtained.

The rate at which the 6,6,7,7-tetrafluorobicyclo(3.2.0)-hept-2-ene is passed through the reaction zone is not critical, although for economical reasons it is preferred to use a rate as high as possible. It is only necessary to heat the tetrafluorobicycloheptene to the reaction temperature for a short time to obtain the desired rearrangement to the tetrafluorocycloheptadienes. The rate of flow through the reactor is greater at low pressures; consequently, it is preferred to operate at pressures of less than 50 mm. of mercury. Pressures of 2 to 6 mm. of mercury are especially satisfactory. In general low pressures are used at high temperatures, and high pressures at low temperatures.

The reaction vessel can be constructed of any inert heat-resistant material. For example, the reactor can be made of quartz, heat-resistant glass, stainless steel, or other inert metal. The reactor can, if desired, be packed with inert materials, e. g., granular quartz, to provide better heat transfer. Metals or other materials which react with the reactants or products should not be used. The reaction zone can be heated by conventional means, electric heaters being very satisfactory for this purpose.

The 6,6,7,7-tetrafluorobicyclo(3.2.0)-hept-2-ene used as starting material in the process of this invention is prepared, as described in greater detail by Coffman et al. in J. Am. Chem. Soc. 71, 490 (1949), by the addition of tetrafluoroethylene to dicyclopentadiene at temperatures of about 190° C. under autogenous pressure in the presence of a polymerization inhibitor, such as hydroquinone. In addition to the 6,6,7,7-tetrafluorobicyclo(3.2.0)-hept-2-ene, another reaction product of tetrafluoroethylene and cyclopentadiene, 5,5,6,6 - tetrafluorobicyclo(2.2.1)-hept-2-ene, is formed as a Diels-Alder adduct of tetrafluoroethylene and cyclopentadiene. The presence of this isomer, however, does not interfere with the pyrolysis of 6,6,7,7-tetrafluorobicyclo(3.2.0)-hept-2-ene to 1,1,2,2-tetrafluorocycloheptadienes, and therefore does not need to be separated from the 6,6,7,7-tetrafluorobicyclo(3.2.0)-hept-2-ene when this latter compound is used in the process of this invention.

In the following examples the reactor consists of a heat-resistant glass tube (the type of glass known commercially as "Vycor") of $13/16$ inch inside diameter 20.5 inches long packed with 6 mm. sections of quartz tubing 6 mm. in diameter. The packed zone is 12 inches long. The packed section of the reaction tube is heated externally by means of a cylindrical electric resistance furnace, and the temperature is recorded by a thermocouple placed in the center of the reaction tube. A high capacity vacuum pump maintains the reaction system at the desired reduced pressure. The 6,6,7,7-tetrafluorobicyclo-(3.2.0)-hept-2-ene reactant is introduced into the reaction zone gradually by conventional means, e. g., by a dropping funnel, and the reaction products are condensed in a trap which is cooled by a coolant capable of condensing by-products at the pressure employed, e. g., liquid nitrogen.

The following examples in which parts are by weight are illustrative of the invention.

Example 1

Two hundred twenty-seven parts of the portion of the reaction mixture of tetrafluoroethylene and dicyclopentadiene boiling at 123–132° C. (obtained by the process of Coffman et al. mentioned previously) and containing a major proportion of 6,6,7,7-tetrafluorobicyclo(3.2.0)- hept-2-ene is added slowly to a reaction tube of the type described in the paragraph above, which is maintained at 700° C.±15° C. at 2 mm. mercury pressure. After the addition is complete, about 120 minutes being required, the cold trap containing the reaction product is removed from the system and the low boiling by-products are allowed to evaporate at room temperature. The residue is then rapidly distilled and there is obtained 203 parts of a liquid reaction product. Fifty parts of this reaction product is fractionated in an efficient fractionating column. The following fractions are obtained:

| Fraction | B. P. at 90 mm. Hg in °C. | Refractive Index, $n_D^{25}$ | Amount, Parts by Weight |
|---|---|---|---|
| 1 | 50–64 | 1.3940 | 3.1 |
| 2 | 64–65 | 1.3885 | 6.1 |
| 3 | 65– | 1.3880 | 5.7 |
| 4 | 65– | 1.3880 | 6.2 |
| 5 | 65–66 | 1.3895 | 4.6 |
| 6 | 66 | 1.3920 | 5.0 |
| 7 | 66–79 | 1.4000 | 5.2 |
| 8 | 79–84 | 1.4050 | 5.0 |
| 9 | 84–87 | 1.4040 | 2.4 |
| 10 | 87–89 | 1.4025 | 4.1 |
| 11 | 89 | 1.4010 | 4.3 |

Analysis of fractions 3, 5, 7 and 11 by nuclear magnetic resonance shows that these fractions have the following compositions, in percents by weight:

| Components | Fractions | | | |
|---|---|---|---|---|
| | 3 | 5 | 7 | 11 |
| 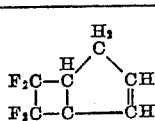 | Percent 40 | Percent 10 | Percent | Percent |
| 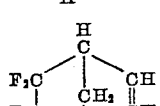 | 60 | 90 | 50 | |
| 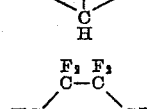 | | | 50 | |
| 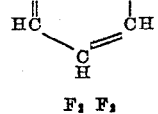 | | | | 95 |

The remainder of the crude reaction product, 153 parts, is then distilled in an efficient fractionating column and the following fractions are obtained:

| Fraction | B. P. at 85 mm. Hg in °C. | Refractive Index, $n_D^{29}$ | Amount, Parts by Weight |
|---|---|---|---|
| 1 | up to 80 | 1.3900 | 100 |
| 2 | 80–86 | 1.4030 | 12 |
| 3 | 86–87 | 1.4035 | 5 |
| 4 | 87–89 | 1.4020 | 5 |
| 5 | 89–90 | 1.4005 | 5 |
| 6 | 90 | 1.3998 | 5 |
| 7 | 90 | 1.3998 | 5 |
| 8 | 90 | 1.4001 | |

*Analysis.*—Calculated for $C_7H_6F_4$: F, 45.75%. Found (fraction 7): F, 45.99%.

Quantitative hydrogenation shows that the product contains two double bonds and the infrared and nuclear magnetic resonance analyses show that the structure of fraction 7 is 1,1,2,2-tetrafluoro-3,6-cycloheptadiene.

Fractions 2, 4, 5, 6, and 8 are combined with fractions 8–11 from the first distillation, and the composite sample is redistilled. On redistillation, there is obtained 42 parts of material boiling at 80–90° C./85 mm. having the following composition as shown by nuclear magnetic resonance analysis:

|   | Percent |
|---|---|
| 1,1,2,2-tetrafluoro-3,6-cycloheptadiene | 50 |
| 1,1,2,2-tetrafluoro-3,5-cycloheptadiene | 40 |
| 5,5,6,6-tetrafluorobicyclo(2.2.1)-hept-2-ene | 3–4 |

*Example II*

Two hundred three parts of the reaction product of tetrafluoroethylene with dicyclopentadiene, boiling at 124–127° C., prepared as described in Example I, is pyrolyzed at 750° C. and 3–6 mm. Hg pressure by the method described in Example I. On distillation of the crude reaction product there is obtained 36.5 parts of material boiling at 74–95° C./92 mm. mercury pressure. This product is redistilled through an efficient fractionating column and the following fractions are obtained:

| Fraction | B. P. at 90 mm. Hg in °C. | Refractive Index, $n_D^{25}$ | Amount, Parts by Weight |
|---|---|---|---|
| 1 | 47–62 | 1.4058 | 2 |
| 2 | 62–65.5 | 1.4008 | 2 |
| 3 | 65.5–66 | 1.4025 | 2 |
| 4 | 66 | 1.4032 | 2 |
| 5 | 66 | 1.4032 | 2.3 |
| 6 | 66–67 | 1.4032 | 2 |
| 7 | 67–68 | 1.4032 | 2 |
| 8 | 68 | 1.4032 | 2 |
| 9 | 68 | 1.4032 | 1.3 |
| 10 | 68 | 1.4052 | 2 |
| 11 | 68–74 | 1.4090 | 2.3 |
| 12 | 74–79.5 | 1.4103 | 2 |
| 13 | 79.5–80.5 | 1.4110 | 2.4 |
| 14 | 80.5–81 | 1.4115 | 2 |
| 15 | 81 | 1.4115 | 2.2 |
| 16 | 81 | 1.4115 | 2.3 |
| 17 | 81–86 | 1.4108 | 2.2 |
| 18 | 86–90 | 1.4040 | 2 |

Nuclear magnetic resonance analysis of fraction 13 indicates that fraction 13 is, and fractions 14–16, inclusive, are composed principally of 1,1,2,2-tetrafluoro-3,5-cycloheptadiene.

*Analysis.*—Calculated for $C_7H_6F_4$: C, 50.61%; H, 3.64%; F, 45.75%. Found (fraction 15): C, 51.16%; H, 3.84%; F, 46.68%.

Fractions 4–9 are impure 5,5,6,6-tetrafluorobicyclo-(2.2.1)-hept-2-ene on the basis of nuclear magnetic resonance analysis.

The tetrafluorocycloheptadienes of this invention are especially useful as starting materials for the preparation of tropolone. The tetrafluorocycloheptadienes are readily hydrolyzed to tropolone by treatment with aqueous alkali. For example, this hydrolysis can be carried out as follows: A mixture of the tetrafluorocycloheptadienes, amounting to 6.59 parts, is shaken for ½ hour with 100 parts of 13% aqueous potassium hydroxide, with intermittent cooling in ice to prevent the exothermic reaction from becoming too vigorous. The reaction mixture is extracted thoroughly with ether, acidified with hydrochloric acid and again extracted thoroughly with ether. The second ether extract is evaporated to yield a yellow solid. The solid is repeatedly extracted with warm petroleum ether and the extract concentrated to a small volume. Cooling encourages the crystallization of 1.46 parts of yellowish white crystals of tropolone, M. P. 51° C. Yields better than 50% have been obtained. This is a more practical synthesis of tropolone than the routes hitherto known since the previous routes are either (*a*) long and costly or (*b*) give very low yields of tropolone.

1,1,2,2-tetrafluoro-3,5-cycloheptadiene is also useful as a starting material for the preparation of 2,2,3,3-tetrafluoropentane-1,5-dioic acid which is in turn useful for reaction with dihydric alcohols, e. g., hexamethylene glycol to form polyesters useful in making films and coating compositions. The oxidation of the tetrafluorocycloheptadiene to the dicarboxylic acid is accomplished by passing a stream of oxygen containing 2–3% ozone through a solution of the tetrafluorocycloheptadiene in methylene chloride at −70 to −80° C., followed by decomposition of the resulting ozonide with hydrogen peroxide in acetic acid solution acidified with sulfuric acid. The decomposition is exothermic and the reaction is carried out under a reflux condenser. The 1,1,2,2-tetrafluoro-3,6-cycloheptadiene can be converted to the 3,5-cycloheptadiene by treatment with aqueous sodium bicarbonate at room temperature.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A 1,1,2,2-tetrafluorocycloheptadiene, $C_7H_6F_4$, having hydrogen on each carbon other than the fluorine-bearing carbons.
2. 1,1,2,2-tetrafluoro-3,5-cycloheptadiene.
3. 1,1,2,2-tetrafluoro-3,6-cycloheptadiene.
4. The process which comprises pyrolyzing 6,6,7,7-tetrafluorobicyclo(3.2.0)-hept-2-ene at 600–750° C. at reduced pressure and isolating the 1,1,2,2-tetrafluorocycloheptadienes obtained.
5. The process which comprises pyrolyzing 6,6,7,7-tetrafluorobicyclo(3.2.0)-hept-2-ene at 600–750° C. at a pressure of up to 50 mm. mercury and isolating the 1,1,2,2-tetrafluorocycloheptadienes obtained.
6. The process which comprises pyrolyzing 6,6,7,7-tetrafluorobicyclo(3.2.0)-hept-2-ene at about 700° C. ±15° C. at a pressure of 2–6 mm. mercury and isolating the 1,1,2,2-tetrafluorocycloheptadienes obtained.

No references cited.